Figure 1:
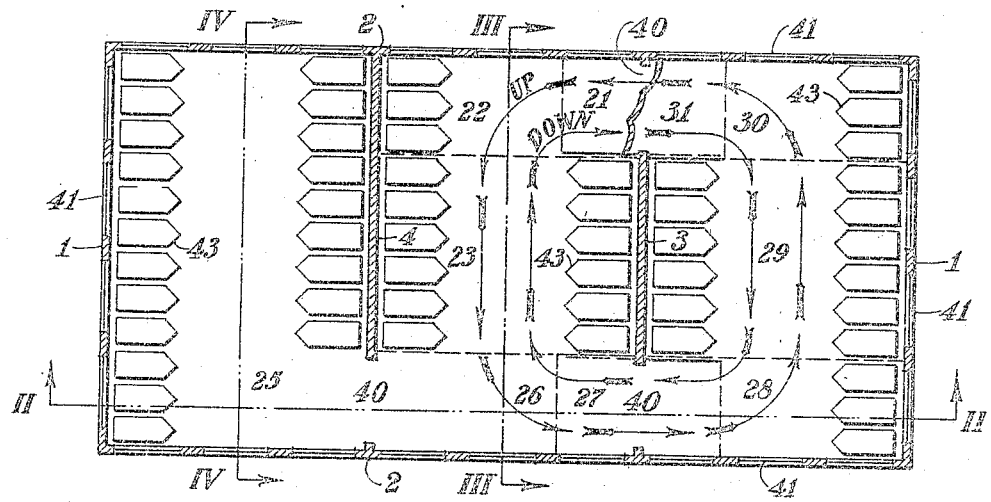

Dec. 23, 1924.

J. J. GAFFNEY ET AL 1,520,638

BUILDING

Filed Nov. 14, 1922     3 Sheets-Sheet 1

JAMES J. GAFFNEY
CARL J. EPPING, } INVENTORS

BY *[signature]*

ATTORNEYS.

Dec. 23, 1924.  1,520,638
J. J. GAFFNEY ET AL
BUILDING
Filed Nov. 14, 1922    3 Sheets-Sheet 2

JAMES J. GAFFNEY  
CARL J. EPPING  } INVENTORS

BY *[signature]*

ATTORNEYS.

Dec. 23, 1924.

J. J. GAFFNEY ET AL 1,520,638

BUILDING

Filed Nov. 14, 1922  3 Sheets-Sheet 3

JAMES J. GAFFNEY
CARL J. EPPING  } INVENTORS

BY *[signature]*

ATTORNEYS.

Patented Dec. 23, 1924.

1,520,638

UNITED STATES PATENT OFFICE.

JAMES J. GAFFNEY AND CARL J. EPPING, OF LOUISVILLE, KENTUCKY; SAID EPPING ASSIGNOR TO SAID GAFFNEY.

BUILDING.

Application filed November 14, 1922. Serial No. 600,886.

*To all whom it may concern:*

Be it known that we, JAMES J. GAFFNEY and CARL J. EPPING, citizens of the United States, residing in the city of Louisville, county of Jefferson, and State of Kentucky, have invented certain new and useful Improvements in Buildings, of which the following is a specification.

Our present invention relates generally to buildings, and more particularly to garage structures of that type wherein provision is made for the running of automobiles and motor cars under their own power to and from parking spaces on any floor and any part of any floor of the building.

In our large and small cities the enormous use of the automobile for business and other purposes and the increasing restrictions as to parking on business streets, coupled with the scarcity of vacant land in or near the business sections, has produced a problem that taxes the architect's and engineer's ingenuity, to design a building that will fit various land areas and satisfactorily reduce this congestion.

One-story garages are not a financial success on the high priced land in the business districts. Garages having a number of floors to which automobiles may be carried by elevators are also impossible by reason of the average time (six minutes) required to carry an automobile up or down, so that ten automobiles per hour is about the capacity of a single elevator. In order to serve the business people, who bring in practically all of these automobiles within the space of an hour and a half and demand them in one-third of that time, the number of elevators required to meet the demand would leave little or no space for storage and parking.

A further object of this invention is the provision of a building of the foregoing type wherein portions may be used for various purposes such as display and exhibition rooms, repair shops, paint shops, offices, accessory storage, or any other desired purpose.

A further object is the provision of a building which will be economical in construction and which will provide maximum storage capacity in proportion to the ground space occupied.

A still further object is the provision of an arrangement whereby each floor of the building includes level storage portions at staggered elevations, connected in one direction by storage floors inclined in opposite directions upon relatively opposite sides of a division wall, and connected in another direction by inclined passageways or ramps, the result of which arrangement is to promote a greater area of level storage space as compared to slanting storage space and at the same time allow of greatly varied extension and augmentation of the level spaces depending upon the shape of the lot on which the building is to be erected.

With the foregoing objects in view, the invention consists of the novel arrangement of parts illustrated in the accompanying drawings, which form a part of this specification, wherein are set forth several different arrangements embodying the invention, although it is obvious that various changes and modifications may be resorted to within the scope of the appended claims.

Figure 2:
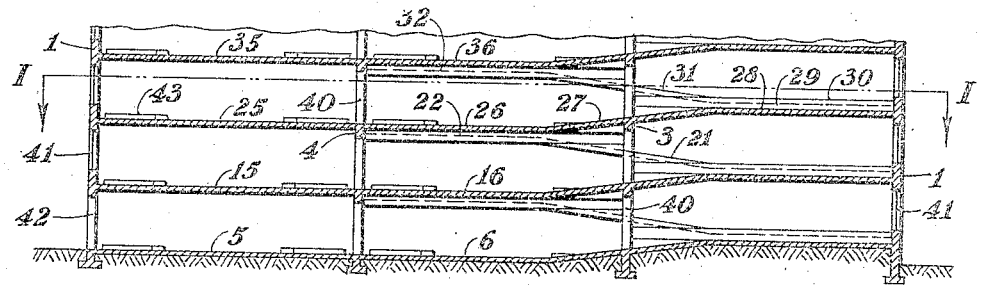
Figures 3, 4:
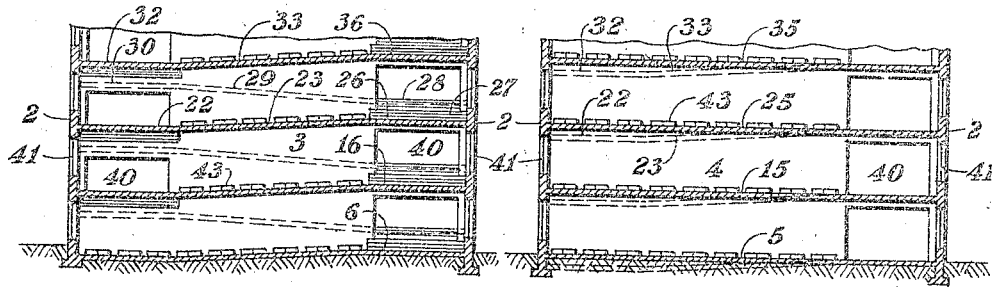
Figure 5:
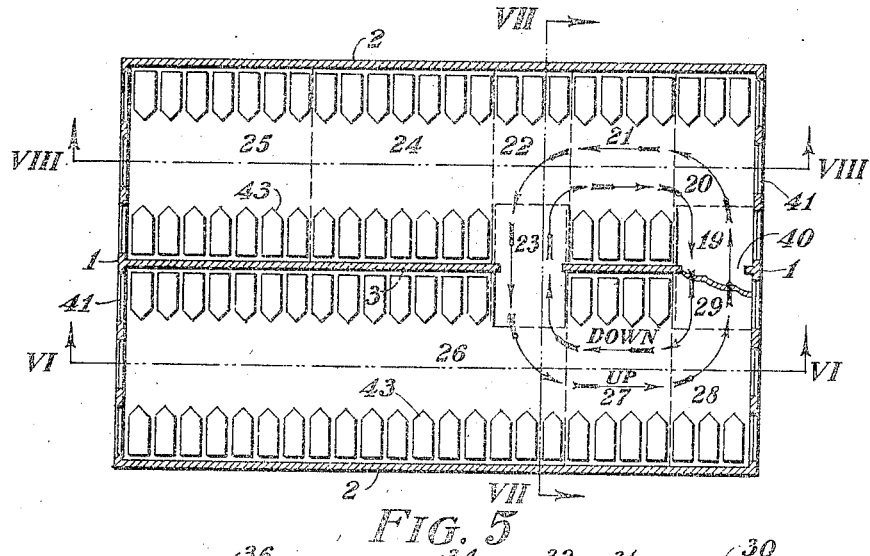
Figure 6:
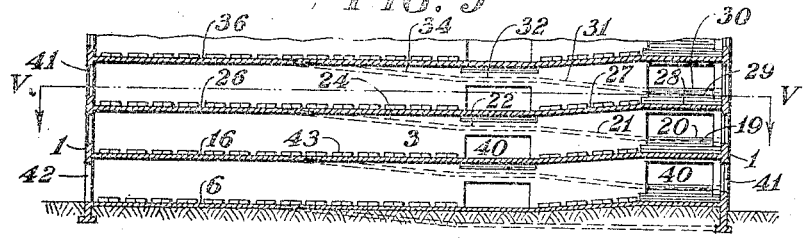
Figure 7:
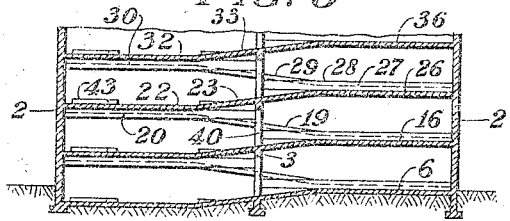
Figure 8:
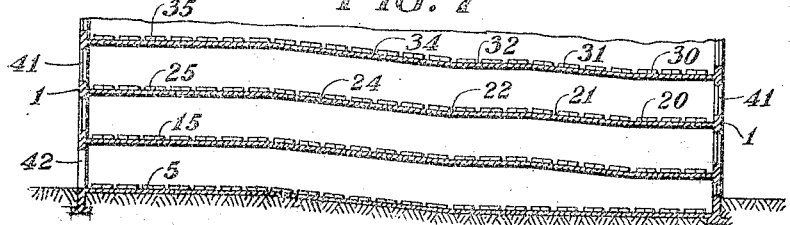
Figure 9:
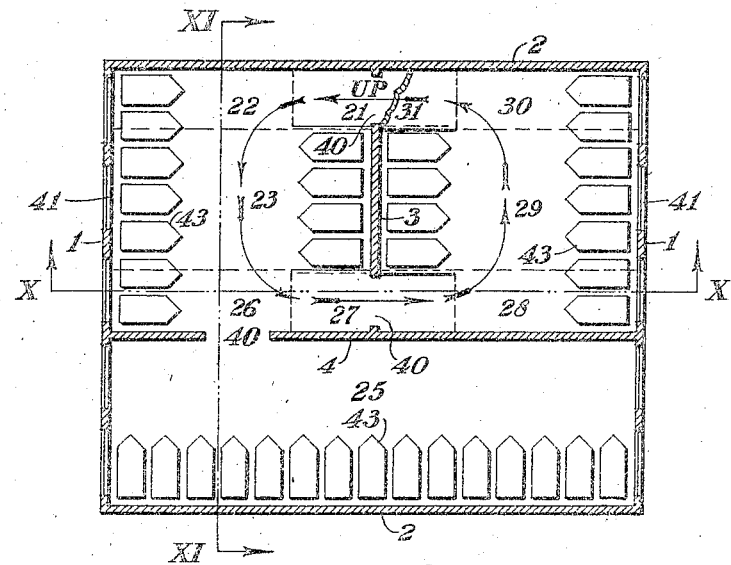
Figure 10:
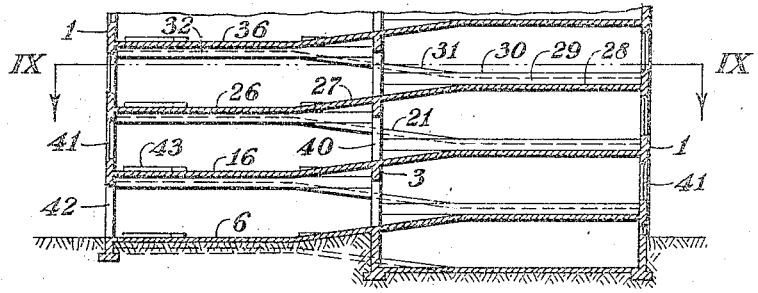
Figure 11:
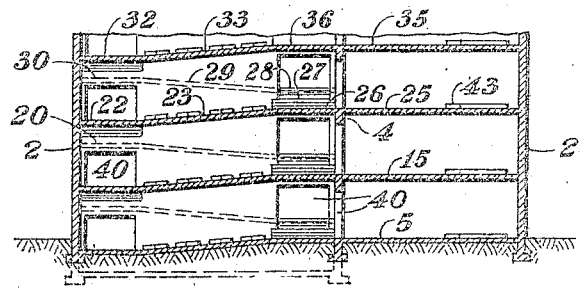

In the drawings, wherein similar numerals designate like parts in the several views, Figure 1 is a horizontal section on the line 1—1 of Figure 2 showing one type of building embodying the invention, Figure 2 is a vertical longitudinal section on the line II—II of Figure 1, Figure 3 is a vertical transverse section on the line III—III of Figure 1, Figure 4 is a vertical transverse section on the line IV—IV of Figure 1, Figure 5 is a horizontal section on the line V—V of Figure 6 illustrating another type of building embodying the invention, Figure 6 is a vertical longitudinal section on the line VI—VI of Figure 5, Figure 7 is a vertical transverse section on the line VII—VII of Figure 5, Figure 8 is a vertical longitudinal section on the line VIII—VIII of Figure 5, Figure 9 is a horizontal section on the line IX—IX of Figure 10 illustrating a third type of building embodying the invention, Figure 10 is a vertical longitudinal section on the line X—X of Figure 9, Figure 11 is a vertical transverse section on the line XI—XI of Figure 9.

Referring to the building arrangement shown in Figures 1 to 4, 1 indicates the end walls and 2 indicates the side walls of the building. The building shown is divided into three separate parts by division walls 3 and 4. The outside walls are provided with suitable windows 41 and with a doorway 42 providing entrance to the ground floor of the building. The division walls 3 and 4 are provided with doorways 40, which doorways may be equipped with sliding or rolling or other types of manually operated or automatic firedoors (not shown) whereby provision may be made for completely isolating each part of the building in case of fire, minimizing the fire hazard on the entire building and on account of which the lowest possible insurance premium may be obtained.

One of the parts of the building confined between the side walls 2 and between end wall 1 and dividing wall 4 has a level ground floor 5 and a plurality of superimposed floors 15, 25, 35, each side of which, along the walls, may be used for the parking of motor vehicles thereon, with a central driveway between the parking spaces. These level floors may also be used as display rooms, repair shops, accessory storage rooms or any other suitable purpose desired by the occupants of the building. It is obvious that while we have shown parking spaces on two sides of a central driveway in the aforesaid part of the building, this arrangement may be modified by parking upon only one side to suit the available ground area of the building.

The remaining two parts of this building are provided with a plurality of superimposed floors, portions of which lie in level planes and other portions of which lie in slightly slanted planes which connect the level planes; all of which are so constructed as to form a continuity of ascending and descending floors, along which motor vehicles may proceed under their own motive power, from the ground floor to the uppermost floor of the building, space being provided on each side of the slant and level floors along the walls on each story for the parking of vehicles or the storage of merchandise, without interfering with the progress of ascending or descending vehicles. The level portion 6 of ground floor in the center portion of building, between walls 3 and 4, lies directly under and in the same plane as the corresponding floors 16, 26, 36.

To explain the method of continuity in the floors embodied by this invention, we will assume a vehicle ascending from level portion 26 on Figure 1 (which we will call the normal third floor line) along the line of arrow heads marked "up" continuing circuitously to a point directly over level portion 26 and designated 36, which we will call the normal fourth floor line. Leaving the level portion 26, the motor car proceeds up an inclined passageway 27, through doorway 40 in division wall 3, which inclined passageway connects with another level portion or floor 28. From the level floor 28, the car proceeds upward on a slant floor 29 which connects with a level floor 30. This level floor 30 is connected to a similar level portion 32 by means of an inclined passageway 31 through another doorway 40 in division wall 3. From the latter level floor 32 the motor car continues in its upward flight along a slant floor 33 until it reaches and connects with a level portion 36, which lies directly above the level floors 26 described at the start of this illustrative example; other stories are connected to each other in a similar manner.

These level and slant floor spaces described above and shown on Figure 1 between the outside and the division walls are wide enough to provide driveways of sufficient width to allow motor vehicles to pass each other when moving in opposite directions and also to provide parking spaces for automobiles or merchandise on both sides of the driveway. Parking spaces may be arranged by having raised blocks or islands 43 which are pointed on their outer ends and are of a sufficient height to prevent driving or backing a vehicle thereover, thereby adapting them to engage the wheels of a vehicle and guiding it into position, or these islands 43 may be omitted and the vehicles placed as closely together as possible along the walls.

A floor lying in parallel planes to upper floors my lead downward from level part 6 of ground floor to a point below the grade line, as the exigencies of the case or the cost of the excavations may dictate.

In Figures 5 to 8 we have shown a building arrangement consisting of two parts, divided by a single lengthwise centrally located wall 3 having doorways 40 connecting one part of the building with the other. In this arrangement one part of the building is provided with a plurality of superimposed floors with level portions 6, 16, 26, 36, shown on Figure 6, and the other part of the building on other side of division wall 3 is provided with other superimposed floors with level portions 5, 15, 25, 35, shown on Figure 8, and lying in the same planes as level portions 6, 16, 26, 36 respectively, shown on Figure 6.

These level portions of floors from ground floor to uppermost floor are connected to each other in a continuous manner by a series of slant floors, level platforms and inclined passageways, in a manner somewhat similar to and as is shown in Figures 1 to 4 and heretofore described. Like parts of this building also have the same reference numbers as shown for building illustrated by Figures 1 to 4.

In Figures 9 to 11 we have shown another building arrangement consisting of three parts, having end walls 1, side walls 2, a division wall 3, separating two parts of building from each other, having slant floors and level places in the superimposed floors thereof; this arrangement also includes a third part separated from the other two parts by means of a dividing wall 4, and this latter third part has a series of superimposed level floors 5, 15, 25 and is connected with one of the other parts of the building by means of doors 40 in dividing wall 4.

This arrangement shown by Figures 9 to 11, is in theory and principle the same as the building shown by Figures 1 to 4, excepting that the part of the building containing the level floors is placed on the side of the slant floor parts, instead of at the end. In the design shown by Figures 9 to 11, the inclined passageways passing through doors 40 in division wall 3 are of a width to allow only one vehicle to ascend or descend same at a time and the part of the building which has the level floors is shown of a width to provide a driveway with space for parking or storing of vehicles on one side thereof. It is obvious however that this space may be made of any other suitable width, and the space may be used for purposes other than parking of vehicles.

While we have indicated solid walls with door openings 40, for all division walls 3 and 4 it is obvious that a series of columns and girders may be substituted, except that by such a substitution, the isolation of one part of the building from another fails, thereby increasing the firehazard and causing a higher fire insurance rate for the building and storage contents.

We claim:

1. A building having superimposed level storage floors, and other storage floors portions of which lie in level planes at staggered elevations, each of said latter floors also including slanting storage portions oppositely inclined and connecting its level portions along spaced vertically parallel planes, and oppositely inclined ramps connecting the level portions transversely with respect to said slanting portions and forming therewith circuitous driveways portions of which open onto the first mentioned level floors.

2. A building having superimposed level storage floors, and other storage floors portions of which lie in level planes at staggered elevations, each of said latter floors also including slanting storage portions oppositely inclined and connecting its level portions along spaced vertically parallel planes, oppositely inclined ramps connecting the level portions transversely with respect to said slanting portions and forming therewith circuitous driveways portions of which open onto the first mentioned level floors, and means to divide and separate portions of each floor, consisting of a division wall having doorways across the said ramps.

3. A building having outer walls, a division wall therein, level storage floors and other superimposed storage floors, each including portions which lie in level planes adjacent to the said outer walls as well as slanting portions oppositely inclined upon opposite sides of the said division wall and connecting said level portions, and inclined ramps connecting the said level portions in a direction transverse with respect to the said slanting portions and forming therewith circuitous driveways portions of which open onto the first mentioned level floors.

4. A building having outer walls, a division wall therein, level storage floors and other superimposed storage floors, each including portions which lie in level planes adjacent to the said outer walls as well as slanting portions oppositely inclined upon opposite sides of the said division wall and connecting said level portions, and inclined ramps connecting the said level portions in a direction transverse with respect to the said slanting portions and forming therewith circuitous driveways portions of which open onto the first mentioned level floors, said division wall having doorways extending across the said ramps as and for the purpose described.

5. A building having outer walls provided with windows and certain of which has an entrance doorway, a division wall within the building having doorways through which those portions of the building upon opposite sides of the division wall are connected, level storage floors, and other superimposed storage floors, each having level portions at staggered elevations and upon opposite sides of the division wall adjacent to the outer walls, each of the latter floors having other portions reversely inclined upon opposite sides of the division wall and connecting the said level portions, and also having inclined ramps connecting the said level portions and arranged transversely with respect to the said slanting portions and forming therewith circuitous driveways portions of which open onto the first mentioned level floors.

6. A building having outer walls provided with windows and certain of which has an entrance doorway, a division wall within the building having doorways through which those portions of the building upon opposite sides of the division wall are connected, level storage floors and other superimposed storage floors, each having level portions at staggered elevations and upon opposite sides of the division wall adjacent to the outer walls, each of the latter floors having other portions reversely inclined upon opposite sides of the division wall and connecting the said level portions, and also having inclined ramps connecting the said level portions and arranged transversely with respect to the said slanting portions, each of the level portions and the said inclined portions being of sufficient width to constitute a driveway and a storage space for vehicles and merchandise along the driveway and forming with the said ramps a circuitous passageway connecting the several floors portions of which open onto the first mentioned level storage floors.

7. A building having outer walls provided with windows and certain of which has an entrance doorway, a division wall within the building having doorways through which those portions of the building upon opposite sides of the division wall are connected, level storage floors, and other superimposed storage floors, each having level portions at staggered elevations and upon opposite sides of the division wall adjacent to the outer walls, each of the latter floors having other portions reversely inclined upon opposite sides of the division wall and connecting the said level portions, and also having inclined ramps connecting the said level portions and arranged transversely with respect to the said slanting portions, the said level portions and said slanting portions being of sufficient width to constitute a driveway and a storage space for vehicles and merchandise along the driveway and the said ramps being of sufficient width to constitute a driveway alone and forming with the said level and inclined portions a circuitous passage connecting the several floors portions of which open onto the first mentioned level storage floors.

JAMES J. GAFFNEY.
CARL J. EPPING.